(12) United States Patent
Mir

(10) Patent No.: US 6,254,753 B1
(45) Date of Patent: Jul. 3, 2001

(54) HIGH PURITY ELECTRODEIONIZATION

(76) Inventor: Leon Mir, 15 Hobart Rd., Newton, MA (US) 02459

(*) Notice: Subject to any disclaimer, the term of this patent is extended or adjusted under 35 U.S.C. 154(b) by 0 days.

(21) Appl. No.: 09/395,313

(22) Filed: Sep. 13, 1999

(51) Int. Cl.$^7$ .................................................. C02F 1/469

(52) U.S. Cl. ..................... 204/524; 204/536; 204/632; 204/633

(58) Field of Search .................................. 204/632, 633, 204/524, 533, 536

(56) References Cited

U.S. PATENT DOCUMENTS

| | | |
|---|---|---|
| Re. 35,741 | 3/1998 | Oren et al. ............................ 204/524 |
| 4,632,745 | 12/1986 | Giuffrida et al. .................... 204/301 |
| 4,636,296 * | 1/1987 | Kunz .................................. 204/182.5 |
| 4,747,929 | 5/1988 | Siu et al. ............................. 204/301 |
| 4,753,681 | 6/1988 | Giuffrida et al. ................. 134/22.17 |
| 4,804,451 | 2/1989 | Palmer ................................ 204/301 |
| 4,871,431 | 10/1989 | Parsi ................................. 204/182.4 |
| 4,931,160 | 6/1990 | Giuffrida ............................. 204/301 |
| 4,956,017 | 9/1990 | Giuffrida et al. ................... 204/301 |
| 5,019,270 | 5/1991 | Afeyan et al. ...................... 210/656 |
| 5,026,465 | 6/1991 | Katz et al. ......................... 204/182.4 |
| 5,066,375 | 11/1991 | Parsi et al. ......................... 204/182.4 |
| 5,093,197 | 3/1992 | Howard et al. ..................... 428/372 |
| 5,116,509 | 5/1992 | White .................................. 210/644 |
| 5,120,416 | 6/1992 | Parsi et al. ........................ 204/182.4 |
| 5,126,026 * | 6/1992 | Chlanda ............................. 204/301 |
| 5,154,809 | 10/1992 | Oren et al. ......................... 204/182.4 |
| 5,203,976 | 4/1993 | Parsi et al. ........................ 204/182.4 |
| 5,228,989 | 7/1993 | Afeyan et al. ..................... 210/198.2 |
| 5,292,422 | 3/1994 | Liang et al. ......................... 204/301 |
| 5,308,466 | 5/1994 | Ganzi et al. ........................ 204/151 |
| 5,308,467 | 5/1994 | Sugo et al. .......................... 204/301 |
| 5,316,637 | 5/1994 | Ganzi et al. ...................... 204/182.4 |
| 5,346,924 | 9/1994 | Giuffrida ............................. 521/28 |
| 5,376,253 | 12/1994 | Rychen et al. ...................... 204/301 |
| 5,384,042 | 1/1995 | Afeyan et al. ..................... 210/198.2 |
| 5,503,729 | 4/1996 | Batchelder et al. ................. 204/630 |

(List continued on next page.)

OTHER PUBLICATIONS

P–Series Heavy Industrial CDI® Systems Single and Multiple Module, United States Filer Corporation, Lowell, Massachusetts, No month/year provided.

Deionization, EDI and Membranes: Practical Ways to Reduce Chemical Usage When Producing High–Purity Water, Ultrapure Water® Jul./Aug. 1999, pp. 52–55.

Gary C. Ganzi et al., Water Purification and Recycling Using the CDI Process, Environmental Progress, vol. 11, No. 1, Feb. 1992, pp. 49–53.

E. Glueckauf, M.Sc., D.Sc., Electro–Deionisation Through a Packed Bed, British Chemical Engineering, Dec. 1959, pp. 646–651.

O. Kedem et al., A Simple Electrodialysis Stack, Desalination, 24 (1978) pp. 313–319, Elsevier Scientific Publishing Company, Amsterdam—Printed in The Netherlands, No month given.

Primary Examiner—Kathryn Gorgos
Assistant Examiner—Thomas H Parsons
(74) Attorney, Agent, or Firm—Fish & Richardson, P.C.

(57) ABSTRACT

Electrodeionization apparatus for purifying water includes a cathode, an anode, and a plurality of alternating anion permeable membranes and cation permeable membranes between the cathode and anode that define concentrating and diluting flow channels between adjacent pairs of membranes. Each concentrating flow channel includes a first guard channel adjacent to the anion permeable membrane, a second guard channel adjacent to the cation permeable membrane, and a brine channel between the first and second guard channels. The first and second guard channels have water with lower concentration of dissolved ions than water in the brine channel so as limit parasitic transfer from a concentrating flow channel to a diluting flow channel.

6 Claims, 1 Drawing Sheet

U.S. PATENT DOCUMENTS

| | | | |
|---|---|---|---|
| 5,512,173 | 4/1996 | Uchino et al. | 204/632 |
| 5,531,899 | 7/1996 | Yen et al. | 210/638 |
| 5,558,753 | 9/1996 | Gallagher et al. | 204/632 |
| 5,593,563 | 1/1997 | Denoncourt et al. | 204/524 |
| 5,679,228 | 10/1997 | Elyanow et al. | 204/524 |
| 5,679,229 | 10/1997 | Goldstein et al. | 204/524 |
| 5,681,438 | 10/1997 | Proulx | 204/627 |
| 5,738,775 | 4/1998 | Nagai et al. | 204/632 |
| 5,759,373 | 6/1998 | Terada et al. | 204/524 |
| 5,762,774 | 6/1998 | Tessier | 204/524 |
| 5,833,861 | 11/1998 | Afeyan et al. | 210/656 |
| 5,858,191 | 1/1999 | DiMascio et al. | 204/524 |
| 5,868,915 | 2/1999 | Ganzi et al. | 204/524 |
| 5,961,805 | 10/1999 | Terada et al. | 204/632 |
| 6,056,878 | 5/2000 | Tessier et al. | 210/639 |

\* cited by examiner

HIGH PURITY ELECTRODEIONIZATION

BACKGROUND OF THE INVENTION

1. Field of the Invention

The invention relates to apparatus and methods for carrying out electrode ionization to purify water.

2. Description of the Related Art

Electrode ionization is a process for removing ions from liquids by sorption of these ions into a solid material capable of exchanging these ions for either hydrogen ions (for cations) or hydroxide ions (for anions) and simultaneous or later removal of the sorbed ions into adjacent compartments by the application of an electric field. (See Glueckauf, E., "Electro-Deionization Through a Packed Bed", Dec. 1959, pp. 646–651, British Chemical Engineering for a background discussion.) The hydrogen and hydroxide ions needed to drive the ion exchange process are created by splitting of water molecules at the interface of anion and cation exchanging solids that contact each other in the orientation that depletes the contact zone of ions, when in the presence of an electric field. This orientation requires that the anion exchanging material face the anode and the cation exchanging material face the cathode. The created hydroxide ions enter the anion exchanging material, and the created hydrogen ions enter the cation exchanging material.

The electrode ionization process is commonly carried out in an apparatus consisting of alternating diluting compartments and concentrating compartments separated by anion permeable and cation permeable membranes. The diluting compartments are filled with porous ion exchanging solid materials through which the water to be deionized flows. The ion exchanging materials are commonly mixtures of cation exchanging resins and anion exchanging resins (e.g., U.S. Pat. No. 4,632,745), but alternating layers of these resins have also been described (e.g., U.S. Pat. No. 5,308,467). Ion exchanging materials consisting of woven and non-woven fibers have also been described. (e.g., U.S. Pat. Nos. 5,308,467 and 5,512,173). The compartments adjoining the diluting compartment into which the ions are moved by the applied electric field, called concentrating compartments, may be filled with ion exchanging materials or with inert liquid permeable materials. An assembly of one or more pairs of diluting and concentrating compartments, referred to as a "cell pair", is bounded on either side by an anode and a cathode which apply an electric field perpendicular to the general direction of liquid flow.

The diluting compartments are each bounded on the anode side by an anion permeable membrane and on the cathode side by a cation permeable membrane. The adjacent concentrating compartments are each correspondingly bounded by a cation permeable membrane on the anode side and an anion permeable membrane on the cathode side. The applied electric field causes anions to move from the diluting compartment across the anion permeable membrane into the concentrating compartment nearer the anode and cations to move from the diluting compartment across the cation permeable membrane into the concentrating compartment nearer the cathode. The anions and cations become trapped in the concentrating compartments because the movement of anions toward the anode is blocked by a cation permeable membrane, and the movement of cations toward the cathode is blocked by an anion permeable membrane. A flow of water is set up to remove the ions from the concentrating compartments. The net result of the process is the removal of ions from the water stream flowing through the diluting compartments and their concentration in the water flowing through the concentrating compartments.

Although at times product water from an electrode ionization (EDI) stack may exceed 18 mega ohms, in general, vendors of EDI equipment will only guarantee a much lower water purity. (US Filter Literature No.: US2006). Application of EDI for the preparation of water for high-pressure boilers and semiconductor manufacture therefore requires that mixed ion exchange polishers be used to treat the EDI product water. It would be desirable to have an EDI system that could reliably produce water equal to that of mixed ion exchange beds. If an EDI system were developed that reliably produced a water with conductivity in the range of 18 mega ohms, it would offer very significant advantages in the design of high purity water systems.

In an EDI stack operated at a sufficiently high current density, the ion exchange resin will be so highly regenerated that it should be capable of producing water equivalent to that produced by mixed ion exchange beds. There are two mechanisms responsible for the degradation of the potential performance of EDI stacks. The one with the largest impact is the diffusion of carbon dioxide from the concentrating compartment back into the diluting compartment. If free carbon dioxide is present in the EDI feed, as it generally is, it will also be present in the concentrate, and since it is not ionic it will diffuse freely through the cation membrane back to the diluting compartment. It cannot diffuse through the anion membrane because most of the anion membrane is alkaline and the carbon dioxide would be converted into bicarbonate in the membrane and forced back into the concentrating compartment by the voltage gradient. Even when no free carbon dioxide is present in the feed water, but bicarbonate ion is present, the problem persists. Bicarbonate or carbonate ions are forced by the voltage gradient within the concentrating compartment toward the cation membrane. The boundary layer next to this membrane is acidic, as is the membrane itself. This converts both bicarbonate and carbonate into carbon dioxide, which can diffuse freely into the diluting compartment through the cation membrane. The involvement of carbon dioxide in degrading the purity of EDI product water is described in the patent literature. (e.g., U.S. Pat. No. 5,868,915). Efforts to remedy this problem have centered on increasing the degree and uniformity of regeneration of the anion exchanging resin in the diluting compartment. These efforts have not been successful because the origin of the problem lies, as pointed out above, in the concentrating compartment.

The second, more fundamental mechanism that limits the ultimate purity of the water that can be produced by EDI is the imperfect perm selectivity of ion exchange membranes; i.e., some cations from the concentrating compartment penetrate the anion membrane and some anions penetrate the cation membrane. In both cases the voltage gradient will then force them into the diluting compartment. The Donnan equation (see "Demineralization by Electrodialysis" by J. R. Wilson Butterworth Scientific Publications, 1960, p. 56) predicts that the penetration of co-ions into the membranes decreases with a decrease in the concentration of these ions in the concentrating compartment. The parasitic processes are illustrated in FIG. 1, which shows a single concentrating channel 10, having cation permeable membrane 12, anion permeable membrane 14 oriented as indicated between anode 16 and cathode 18.

It is possible to reduce the impact of these parasitic transfer processes by, e.g., reducing the concentration of ions in the concentrating stream by reducing the fraction of feed water that is recovered. This approach has a relatively small effect at any reasonable water recovery. Another possibility is to divide the EDI system into two sequential parts. The second, polishing part, would operate with a very low concentration of ions in the permeate and thus produce a higher quality water.

SUMMARY OF THE INVENTION

In one aspect, the invention features, in general, electrode ionization apparatus for purifying water. The apparatus includes a cathode, an anode, and a plurality of alternating anion permeable membranes and cation permeable membranes between the cathode and anode that define concentrating and diluting flow channels between adjacent pairs of membranes. Each concentrating flow channel includes a first guard channel adjacent to the anion permeable membrane, a second guard channel adjacent to the cation permeable membrane, and a brine channel between the first and second guard channels. The first and second guard channels have water with lower concentration of dissolved ions than water in the brine channel so as limit parasitic transfer from a concentrating flow channel to a diluting flow channel.

Preferred embodiments of the invention may include one or more of the following features. In preferred embodiments a further anion permeable membrane separates the first guard channel from the brine channel, and a further cation permeable membrane separates the second guard channel from the brine channel. The first guard channel includes anion exchange material, and the second guard channel includes cation exchange material.

Embodiments of the invention may include one or more of the following advantages. The anion exchange resin in the first guard channel and the additional anion membrane act as a transfer layer for the anions moving to the middle brine channel, while the cation exchange material in the second guard channel and the additional cation membrane act as a transfer layer for the cations moving to the middle brine channel. The water (e.g., feed or purified) flowing through both guard channels keeps the concentration of ions at a very low level and thus virtually eliminates both back-diffusion processes.

Other advantages and features of the invention will be apparent from the following description of particular embodiments thereof and from the claims.

DETAILED DESCRIPTION OF PARTICULAR EMBODIMENTS

Figure 1:
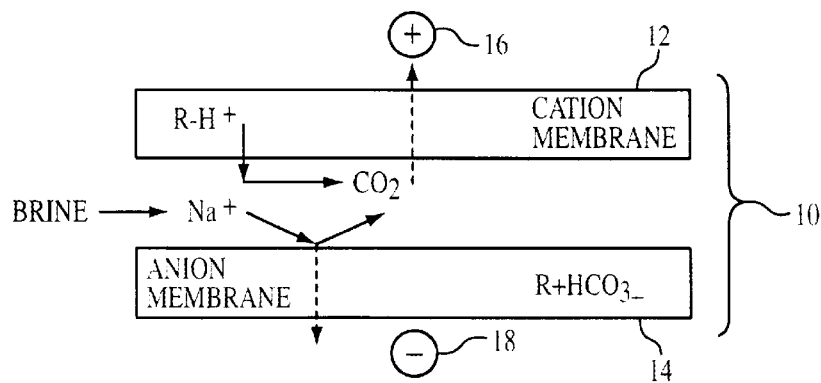
FIG. 1 is a diagram illustrating parasitic processes in a conventional single concentrating channel of an electro-deionizing apparatus.
Figure 2:
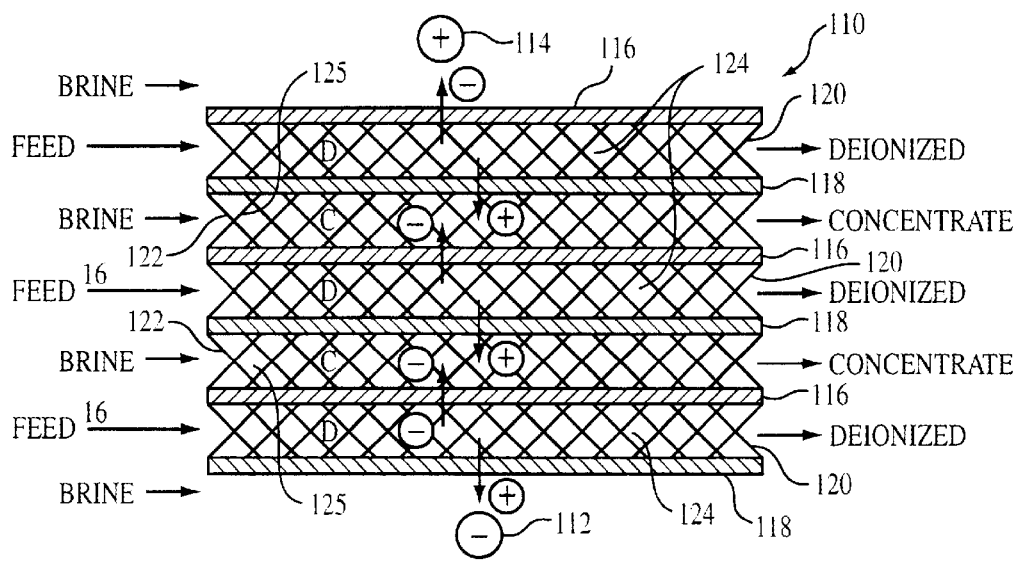
FIG. 2 is a diagram of electrodeionizing apparatus.

FIG. 2 shows electrode ionization apparatus 110. Apparatus 110 includes cathode 112, anode 114 spaced from cathode 112, and a plurality of alternating anion permeable membranes 116, and cation permeable membranes 118. Diluting channels 120 ("D") are provided between each pair of an anion permeable membrane 116 that faces anode 114 and a cation permeable membrane 118 that faces cathode 112. Concentrating channels 122 ("C") are provided between each pair of an anion permeable membrane 116 that faces cathode 112 and a cation permeable membrane 118 that faces anode 114. Water flows are provided past the cathode 112 and the anode 114. Diluting channels 120 and concentrating channels 122 can be about 3.0 mm thick, though other thicknesses can be used. Ion exchange materials 124 are located in diluting channels 120, and spacers/membrane arrangements 125 (shown in more detail in FIG. 3) are located in concentrating channels 122. Ion exchange materials 124 can be fixed ion exchange materials, which are described below. Cathode 112, anode 114, membranes 116 and membranes 118 can be made of components and materials typically used in deionization apparatus, as described, e.g., in the above-referenced patents, which are hereby incorporated by reference.

Figure 3:
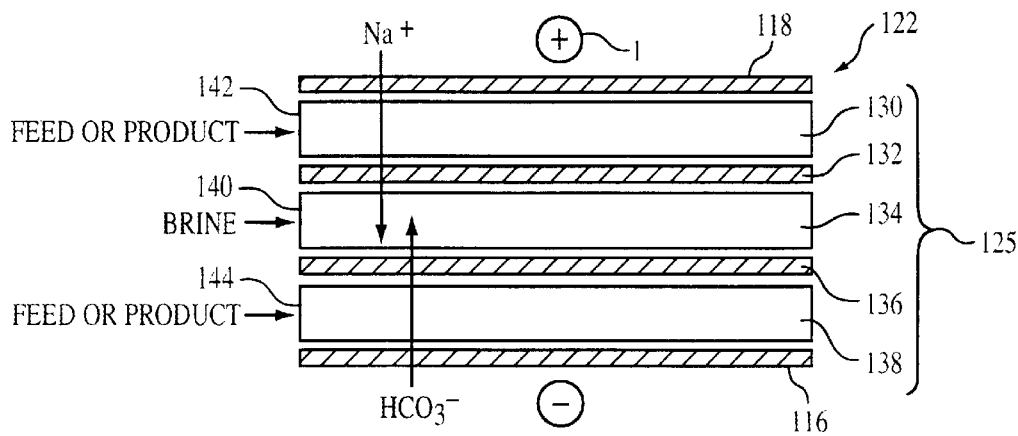
FIG. 3 is a diagram of a concentrating channel of the FIG. 2 apparatus.

Referring to FIG. 3, the spacer/membrane arrangement 125 in each concentrating channel 122 includes cation exchange resin 130, cation permeable membrane 132, spacer 134, anion permeable membrane 136, and anion exchange resin 138. Brine flows through permeable spacer 134 in the central channel 140, while feed or product water, with a concentration of dissolved ions that is much less than that in the brine, flows at a low flow rate through guard channels 142, 144.

As is well known in the art, the components shown on FIG. 2 are assembled together as a stack between pressure plates held together by bolts or a hydraulic ram or in a housing that contains the components and provides manifolds to direct the incoming liquid to and the outgoing liquid from diluting channels 120 and concentrating channels 122. Diluting channels 120 and concentrating channels 122 are typically between 1.0 mm and 5.0 mm thick, and there typically are 10 to 300 diluting channels. The surface area of each membrane is typically between 0.5 and 5.0 square feet.

Fixed ion exchange materials 124 include cation exchange materials and anion exchange materials that are fixed in close contacting position with respect to each other. Such materials are described in detail in an application filed concurrently herewith and entitled "Electrode ionization Apparatus with Fixed Ion Exchange Materials", which application is hereby incorporated by reference. Fixed ion exchange materials 124 can be provided in strands of combined anion and cation exchange materials in woven fabric, nonwoven fabric (randomly oriented strands) or extruded netting. Fixed ion exchange materials could also be provided by open cell foam and by combined exchange particles. The strands used in the fabrics can also take a variety of forms. The strands can be made in the form of a bundle of multiple filaments, in the form of braided strands, and in the form of a combined exchange particle filament, which is made of cation exchange particles and anion exchange particles that are held together by binder. The open cell foam includes cation exchange particles, anion exchange particles and binder and has an interconnected network of flow passages therethrough. The combined ion exchange particles are made up of cation exchange particles, anion exchange particles and binder and are sufficiently large so as to cause an acceptably low pressure drop in the flow channels. In some embodiments the ion exchange materials are not mixed, but instead include only anion exchange materials or particles or cation exchange materials or particles in a channel between membranes or region in a channel between membranes. While it is possible to use packed ion exchange materials in the diluting and concentrating channels in some cases, in all cases the preferred stack design is based on the fixed ion exchange structure described above.

In operation of electrode ionization apparatus 110, feed and brine are supplied to diluting channels 120 (FIG. 2) and concentrating channels 122, respectively, at typical flow rates (e.g., 1–3 cm/sec) and pressure (e.g., 5 to 50 psig), and electric power is supplied to cathode 112 and anode 114 to provide an appropriate current density of 2 to 15 mA/square cm and voltage of 1 to 5 volts per cell pair. The feed 16 supplied to the inlets of diluting channels 120 is typically the permeate of reverse osmosis processing. Either the same feed or a small amount of the purified product of apparatus 110 is provided to guard channels 142, 144 (FIG. 3), and brine supplied to central channel 140 is typically a mixture of the reverse osmosis permeate and brine recirculated from the outlet of the electrode ionization apparatus.

The removal of ions from diluting channels 120 includes two steps. The first step is the diffusion of cations to the cation exchanging solids and the diffusion of anions to the anion exchanging solids in the diluting channels. The applied electric field then causes anions on the exchanging material to travel along the anion exchanging material in the diluting channels in a conductive path to and through the anion permeable membrane into the concentrating compartment nearer the anode. The applied electric field similarly causes cations to travel along the cation exchanging materials in the diluting channels in a conductive path to and through the cation permeable membrane into the concentrating compartment nearer the cathode. The anions and cations become trapped in the concentrating compartments because the movement of anions toward the anode is blocked by cation permeable membranes 118 and 132, and the movement of cations toward the cathode is blocked by anion permeable membrane 116, 136.

Cation exchange resin 130 in guard channel 142 acts as a transfer layer for the cations moving to the middle concentrating compartment 140. Anion exchange resin 138 in guard channel 144 acts as a transfer layer for the anions moving to the middle concentrating compartment 140. A low flow rate of purified water or of feed water through both guard channels 142, 144 keeps the concentration of ions at a very low level and thus virtually eliminates both back-diffusion processes. This low flow of purified water can serve as make up to the concentrate stream, and thus no decrease in water recovery results. The flow rate through the concentrating compartment positioned between the two guard compartments is designed to carry away the bulk of the ions removed from the diluting compartments.

Other advantages of the invention are within the scope of the appended claims.

What is claimed is:

1. Electrodeionization apparatus for purifying water comprising
    a cathode,
    an anode spaced from said cathode,
    a plurality of alternating anion permeable membranes and cation permeable membranes between said cathode and anode defining concentrating and diluting flow channels,
        each said channel being defined between an adjacent pair of said membranes,
        each said diluting flow channel having ion exchange materials therein,
        each said concentrating flow channel including
            a first guard channel adjacent said anion permeable membrane and defined by said anion permeable membrane and a first membrane spaced from said anion permeable membrane,
            a second guard channel adjacent said cation permeable membrane and defined by said cation permeable membrane and a second membrane spaced from said cation permeable membrane, and
            a brine channel between said first and second guard channels,
                said first and second guard channels having water flowing through them with lower concentration of dissolved ions than water in said brine channel so as limit transfer from a said concentrating flow channel to a said diluting flow channel.

2. The apparatus of claim 1 wherein said first membrane is an anion permeable membrane, and a said second membrane is a cation permeable membrane.

3. The apparatus of claim 2 wherein said first guard channel includes anion exchange material, and said second guard channel includes cation exchange material.

4. A method of purifying water comprising providing a cathode, an anode spaced from said cathode, and a plurality of alternating anion permeable membranes and cation permeable membranes between said cathode and anode defining concentrating and diluting flow channels, each said channel being defined between an adjacent pair of said membranes, each said diluting flow channel having ion exchange materials therein,
    supplying feed water into each said diluting flow channel and removing purified water therefrom, said feed water including ions,
    supplying concentrating water into said concentrating channels and removing brine produced in said concentrating channels from ions transported from the diluting channels, and
    providing first and second guard channels having flowing water with lower concentration of dissolved ions than said brine at surfaces of said anion permeable membrane and cation permeable membrane in said concentrating channel so as to limit transfer from said concentrating flow channel to said diluting flow channel, said first guard channel being defined by said anion permeable membrane and a first membrane, said second guard channel being defined by said cation permeable membrane and a second membrane.

5. The method of claim wherein said first membrane is an anion permeable membrane, and said second membrane is a cation permeable membrane.

6. The method of claim 5 wherein said first guard channel includes anion exchange material, and said second guard channel includes cation exchange material.

* * * * *

UNITED STATES PATENT AND TRADEMARK OFFICE
CERTIFICATE OF CORRECTION

PATENT NO. : 6,254,753 B1
DATED : July 3, 2001
INVENTOR(S) : Leon Mir

Page 1 of 1

It is certified that error appears in the above-identified patent and that said Letters Patent is hereby corrected as shown below:

Column 1,
Line 6, change "perm selectivity" to -- permselectivity --
Lines 6, 8 and 26, change "electrode ionization" to -- electrodeionization --

Column 2,
Line 1, change "electrode ionization" to -- electrodeionization --
Line 48, change "perm selectivity" to -- permselectivity --
Line 51, after "of" add -- , --

Column 3,
Lines 7, and 55, change "electrode ionization" to -- electrodeionization --
Line 48, after "of" insert -- an --

Column 4,
Lines 34 and 63, change "electrode ionization" to -- electrodeionization --

Column 5,
Line 9, change "electrode ionization" to -- electrodeionization --

Column 6, claim 5,
After "method of claim" insert -- 4 --

Signed and Sealed this

Second Day of April, 2002

*Attest:*

*Attesting Officer*

JAMES E. ROGAN
*Director of the United States Patent and Trademark Office*